United States Patent [19]
Hiramatsu

[11] 3,832,915
[45] Sept. 3, 1974

[54] HYDRAULIC CONTROL APPARATUS FOR AN AUTOMATIC VEHICLE TRANSMISSION

[75] Inventor: Takeo Hiramatsu, Kyoto, Japan

[73] Assignee: Mitsubishi Jidosha Kogyo Kabushiki Kaisha, Tokyo, Japan

[22] Filed: Oct. 5, 1972

[21] Appl. No.: 295,111

[30] Foreign Application Priority Data

Oct. 5, 1971 Japan ............................... 46-78155

[52] U.S. Cl. .............................................. 74/869
[51] Int. Cl. .......................................... B60k 29/00
[58] Field of Search ............ 74/864, 867, 868, 869, 74/DIG. 1

[56] References Cited

UNITED STATES PATENTS

| | | | |
|---|---|---|---|
| 2,757,552 | 8/1956 | English | 74/869 |
| 2,792,716 | 5/1957 | Christenson | 74/869 |
| 3,546,973 | 12/1970 | Koichi Ohie | 74/868 |
| 3,561,293 | 2/1971 | Shojiro Fujita et al. | 74/869 |
| 3,563,115 | 2/1971 | Tetsuya Iijima et al. | 74/864 |

*Primary Examiner*—Samuel Scott
*Assistant Examiner*—Allan Russell Burke
*Attorney, Agent, or Firm*—Robert E. Burns; Emmanuel J. Lobato; Bruce L. Adams

[57] ABSTRACT

A hydraulic control apparatus for automatic vehicle transmission having a plurality of clutches which are clutched and declutched for transmitting different change gear ratios to an output shaft driven from a vehicle engine drive shaft. A plurality of servo mechanisms sequence the clutching and declutching of the clutches to effect smooth speed changes or gear ratio changes. A mechanism in the control apparatus controls a variable overlapping period between the changes of gear ratios as a function of the drive torque.

4 Claims, 22 Drawing Figures

D-2ND SPEED

D-2ND SPEED

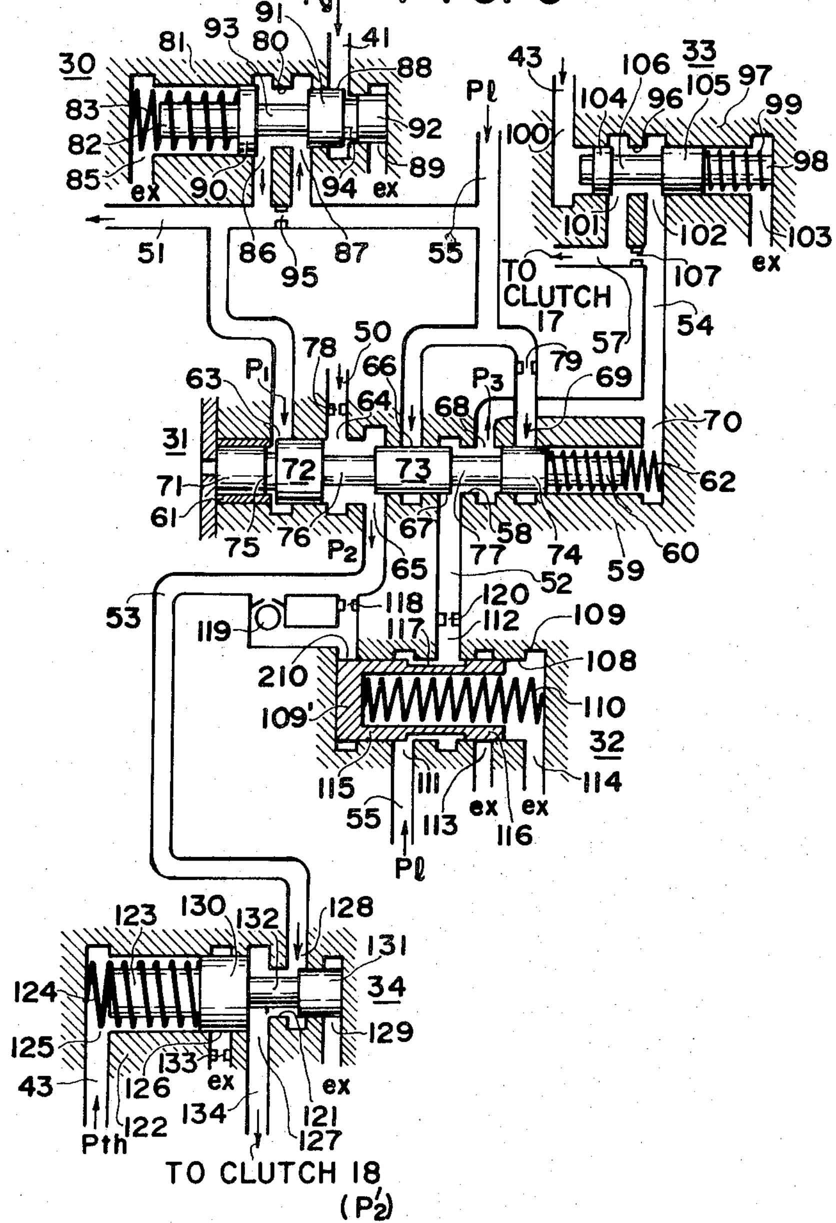
F I G. 5
30
31
32
33
34
TO CLUTCH 17
TO CLUTCH 18
($P_2'$)
Pg
Pl
Pth
ex

HYDRAULIC CONTROL APPARATUS FOR AN AUTOMATIC VEHICLE TRANSMISSION

This invention relates generally to vehicle transmissions and more particularly to a hydraulic control device for an automatic transmission used in an automobile.

Generally in an automatic transmission for an automobile, it is common that the gear ratio changes are executed by declutching one clutch of a plurality of clutches and by clutching another clutch. In the automatic transmissions having such mechanism, it is important to prevent the defects of the mechanism and to hold a comfortable ride by properly selecting the timings of the above declutching and clutching.

In the above operation, for example, if the disengagement is early and the engagement is late, defects take place therebetween, while if the declutching or disengagement is late and the clutching or engagement is early, both engaging mechanisms are operated therebetween so that some contradiction takes place in the transmission with the overall result that the vehicle is braked at the same time a large excessive load is applied to the engaging device and the shock upon shifting is large.

In the event that the drive or gear ratio of the transmission is converted from a low speed drive or gear ratio to a high speed drive or gear ratio when the engine is in a drive state, the overlapping responsive to the output torque of the engine is desirably provided between the disengagement and engagement to prevent the engine from idling. When the engine is being driven, after the clutch functioning for the low speed drive or gear ratio is disengaged, a proper interval is provided to wait until the engine speed is lowered to the high speed gear ratio so as to engage the clutch functioning for high speed gear ratio operation.

On the contrary, in the event that the drive ratio of the transmission is converted from a high speed gear ratio to a low speed gear ratio when the engine is in a drive state, it is desirable to change the timing of the disengagement and the engagement of the clutch according to the travelling speed of the vehicle. That is, in high speed operation it is desirable that after the clutch functioning for a high speed gear ratio setting is disengaged, a proper interval is provided to wait until the engine speed is increased to the low speed gear ratio so as to engage the clutch functioning at the low speed gear ratio, and it is necessary to shorten the intervals as the vehicle speed is lowered. Particularly, in low speed operation the interval is substantially removed normally to allow overlap between both engaging devices. Thus, in low speed operation it is desired that overlapping is provided, the overlapping is reduced continuously as a high speed is assumed and the interval is lengthened. However, when the engine is in a driven state, if there exists an interval between the engagment of both engaging devices, the engine braking state of the vehicle is stopped therebetween, thereafter the clutch (or brake) functioning for the low speed gear ratio is engaged to effect strong engine braking with the result that riding in the vehicle becomes bad.

It is an object of the present invention to provide a proper overlapping or interval responsive to the vehicle state between both the engaging devices thereof.

When the transmission changes from a low speed gear ratio to a high speed gear ratio, if the hydraulic pressure corresponding to the output torque of the engine is supplied to the servo piston of the clutch functioning for the high speed gear ratio, the shock felt upon a speed change is small, and it is preferable to maintain it at the point of endurability of the friction material of the clutches. Particularly, when the opening of the throttle of the carburetor of the engine is small, the output torque of the engine is small so that the hydraulic pressure imparted to the servo piston should be extremely low. In case of automatic speed shifting by an automatic transmission, as shown in FIG. 2, the change of the aforesaid gear ratio in a low throttle opening is conducted at a relatively low vehicle speed. Whereupon, it is desirable that the hydraulic pressure imparted to the servo piston of the clutch functioning for the high speed gear ratio is low as aforementioned. But when the vehicle is accelerated to a high speed after speed shifting so that the driver expects engine braking in a high speed state to assume a low throttle opening, since the negative torque of the engine is strong, the engagement of the clutch (or brake) cannot be held in the above low hydraulic pressure with the result that slip may take place. On the contrary, if the hydraulic pressure is made high so as not to cause slip of the clutch (or brake) when in a state where the engine is braking at high speed, the hydraulic pressure becomes excessively high so that the driver feels a shock when the change gear ratio is converted to a lower change gear ratio to a low speed.

It is another object of the present invention to provide a low hydraulic pressure imparted to the servo piston during speed shifting and relatively high hydraulic pressure imparted thereto after speed shifting.

When an automatic transmission having three drive ratios such as low speed, intermediate speed and high speed (first, second and third speeds) has D position for automatic speed shifting, second speed position for automatic speed shifting in first and second speeds only (or second speed fixed), as shown in FIG. 2, second speed at D position has small range of low vehicle speed in particularly low throttle opening, but the hydraulic pressure imparted to the servo piston of the clutch (or brake) for second speed may be low as previously described. Since the second position is selected expecting the engine to brake in relatively high speed in many cases, it must be a higher hydraulic pressure than that imparted to the servo piston for second speed at D position.

Therefore, it is desirable that the hydraulic pressure imparted to the servo piston for the second speed is made that corresponding to the engine output torque upon speed shifting from first to second speed at D position, and the hydraulic pressure is sufficient to the engine brake torque in high speed in a small range of the throttle opening particularly in the second position.

In order to perform the aforementioned objects in the hydraulic control device for an automatic transmission of the present invention, which comprises first clutch (or brake) functioning for low speed drive ratio having more than two forward drive ratios between the drive shaft connected to an engine and the driven shaft driven by the drive shaft, a second clutch (or brake) functioning for high speed drive ratio, and a mechanism for disengaging the first clutch and for engaging the second clutch upon accelerating speed shifting and for disengaging the second clutch and for engaging the first clutch upon decelerating speed shifting. This mechanism comprises a first servo mechanism for engaging the second clutch, a second servo mechanism for engaging the first clutch, a timing valve for controlling the hydraulic pressure of the servo mechanism for releasing the first clutch by the hydraulic pressure of the servo mechanism for engaging the second clutch upon accelerating speed change, and for controlling the hydraulic pressure of the servo mechanism for releasing the second clutch by the hydraulic pressure of the servo mechanism for engaging the first clutch upon decelerating speed change, and a mechanism for applying linear pressure varying according to the variation of the output torque of an engine at one end of said timing valve so constructed as to lessen the overlapping of the operation of both said servo mechanisms when the drive torque is small and to enlarge the overlapping of the operation when the drive torque is large.

The hydraulic control device or apparatus for an automatic transmission of this invention comprises an orifice control valve disposed between the servo mechanism of the first clutch and a source of hydraulic pressure to be controlled by the governor pressure generated in response to the output shaft speed of the transmission for controlling the linear pressure varying according to the variation of the output torque of the engine for acting one end of said timing valve by the way of decelerating speed change and so constructed as to enlarge the overlapping of the operation of said both servo mechanism when the speed is low and to lessen the overlapping when the speed is high.

The hydraulic control device for an automatic transmission of this invention also comprises an engine brake valve disposed between the timing valve and the servo mechanism of the second clutch to be controlled by the throttle pressure varying according to the variation of the engine output torque so that the oil supplied to the servo mechanism of the second clutch from said timing valve is adapted to pass a throttle by the engine brake valve when the engine output torque is substantially negatively accelerated in a speed change to remove the overlapping between the operations of both said servo mechanisms by imparting a hydraulic pressure higher than the hydraulic pressure of the servo mechanism to said timing valve to provide an interval.

The hydraulic control device for an automatic transmission of this invention also comprises a compensator valve moving for a while even after the first clutch is released upon accelerating speed change for stopping the control action of said timing valve after the engagement of the second clutch is completed to supply hydraulic pressure so that slip may not take place at the second clutch even after the servo mechanism of the second clutch is completed to change speed.

The hydraulic control device for an automatic transmission of this invention as aforementioned may comprise a plurality of friction elements such as friction clutches, friction brakes, etc., a hydraulic regulating valve for selecting the low speed drive ratio effective for manual engine braking and for controlling the line pressure generated between a hydraulic pressure source and the hydraulic pressure source, a hydraulic servo for operating the friction elements by introducing the line pressure, a manual valve for controlling the line pressure to the hydraulic servo, a throttle valve for generating hydraulic signal representing the engine output torque, a govenor valve for generating hydraulic signal representing a vehicle speed, a shift valve for responding in a predetermined manner to the respective hydraulic signals and for controlling the distribution of the line pressure, a servo mechanism of the clutch (brake) functioning the low speed drive ratio, and a pressure-reducing valve for decreasing the hydraulic pressure supplied to the servo mechanism lower than the line pressure between the servo mechanism and the hydraulic pressure source so as to effectively control the engine braking of the low speed condition in high speed by operating the pressure-reducing valve when the manual valve is disposed to the speed shiftable position to the high speed drive ratio to reduce the hydraulic pressure of the servo mechanism and by stopping the operation of the pressure-reducing valve when the manual valve is disposed at the low speed position to effectively conduct the engine brake of the low speed stage in high speed.

FIG. 5 is a diagram of a hydraulic circuit relating to the transmission and control apparatus in FIG. 1;

Figure 1:
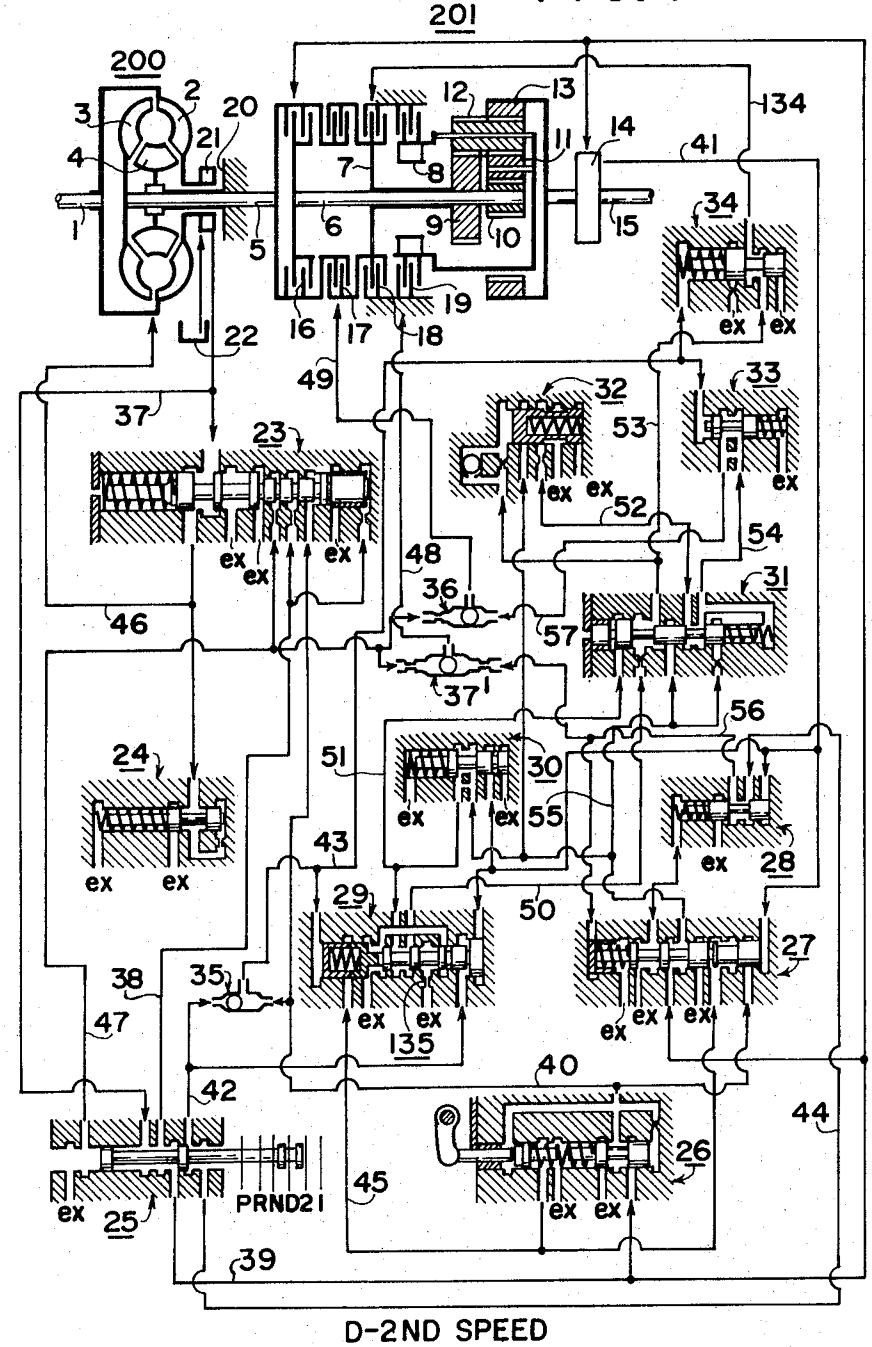
FIG. 1 is a schematic of an automatic change gear transmission of a vehicle provided with a hydraulic control apparatus according to the invention.
Figure 2:
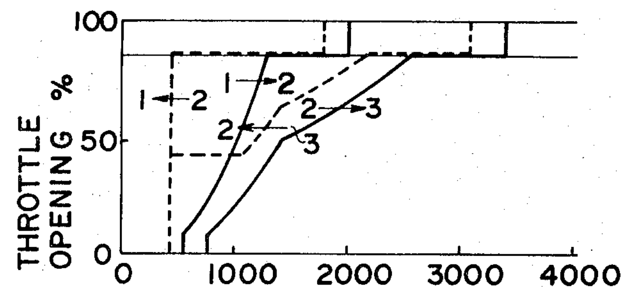
FIGS. 2–4 are diagrams of characteristics of the transmission and control apparatus in FIG. 1.
Figure 12G:
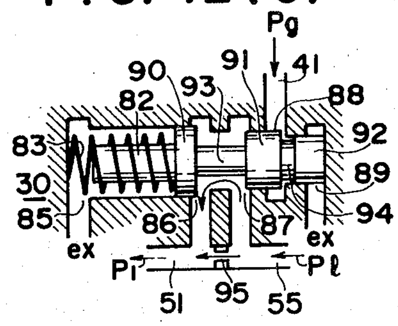
Figure 12I:
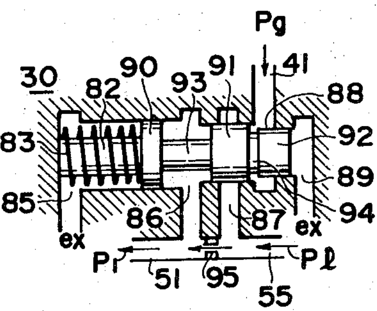
Figure 12H:
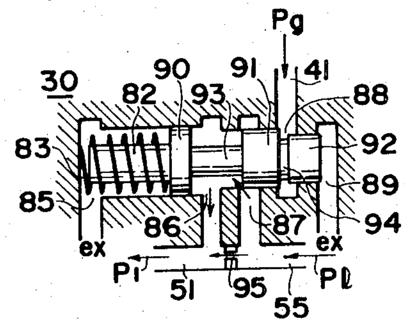
Figure 8:
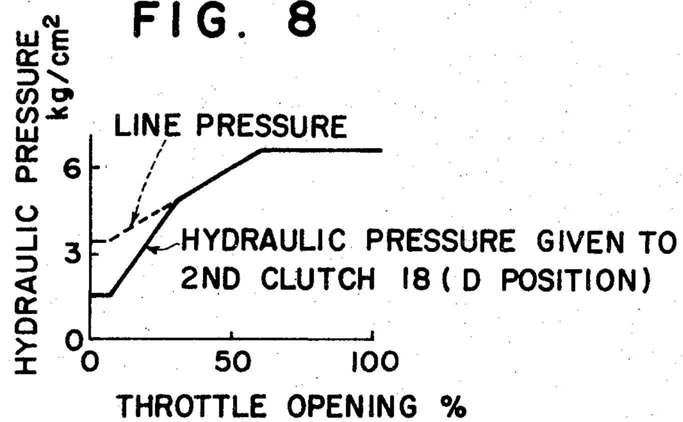
Figure 11:
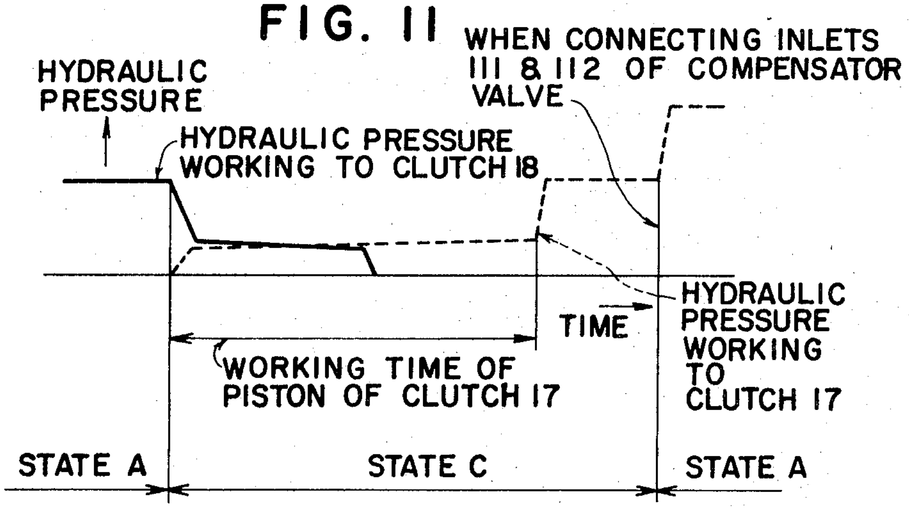
Figure 9:
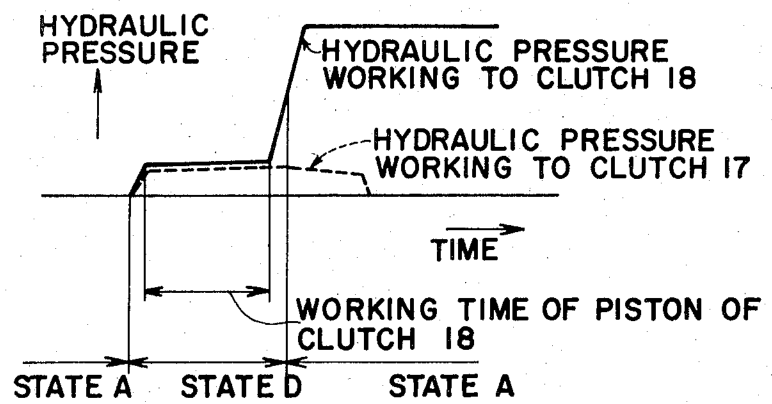
Figure 10:
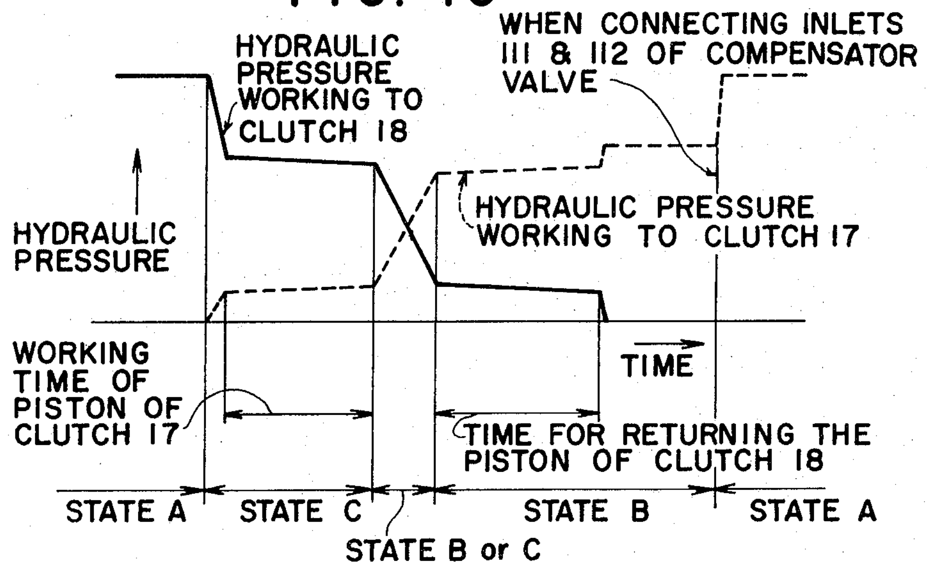
Figure 13:
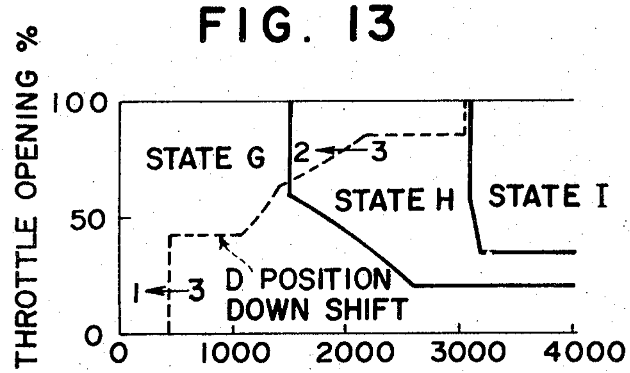
Figure 14:
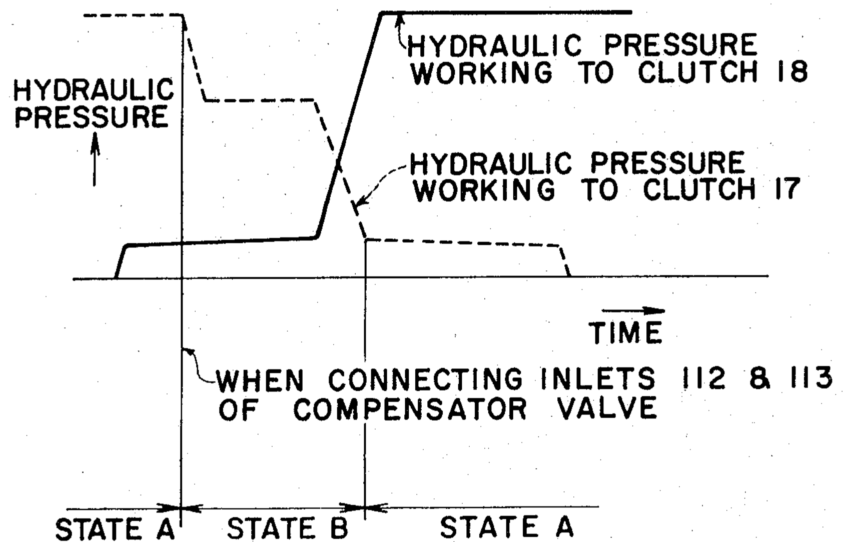
Figure 15:
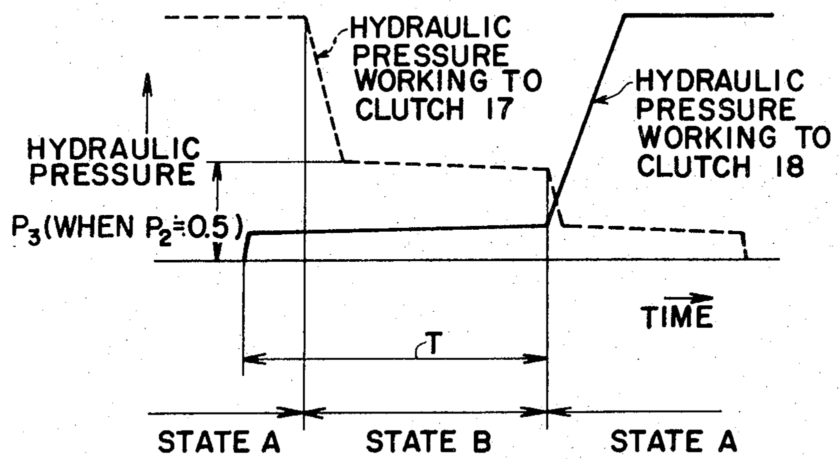
Figure 16:
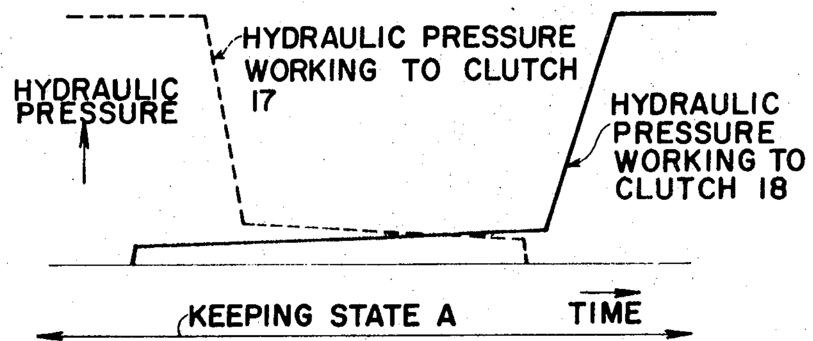

FIGS. 6(A)–6(D) are diagrammatic views of a timing valve of the control apparatus in FIG. 1;

FIG. 7 is an explanatory view of a pressure-reducing valve in the transmission and control apparatus in FIG. 1;

FIG. 8 is a diagram of a characteristic of the pressure of a pressure-reducing valve in the transmission and control apparatus in FIG. 1;

FIGS. 9–11 are diagrams of hydraulic pressure changes in the transmission and control apparatus in FIG. 1;

FIG. 12 is a diagrammatic view of different operating states of an orifice control valve in the transmission and control apparatus in FIG. 1;

FIG. 13 is a diagram of a characteristic of the orifice control valve in FIG. 12; and FIGS. 14, 15 and 16 are diagrams of hydraulic pressure changes in a clutch piston of the transmission and control apparatus of FIG. 1.

Other objects and advantages will appear from the following description of an example of the invention, and the novel features will be particularly pointed out in the appended claims.

The hydraulic control device for a vehicle automatic transmission of the present invention as the embodiment will now be described with reference to the drawings. FIG. 1 shows a hydraulic automatic transmission having forward three state planetary gear system, and a torque converter 200 which has a pump impeller 2, a turbine impeller 3 and stator 4. Power is transmitted from an input shaft 1 through a fluid or oil in the torque converter 200 to a first intermediate shaft 5, and is further transmitted through a transmission 201 provided with a hydraulic servo device to an output shaft 15.

The transmission 201 with a hydraulic servo device has a plurality of clutches 16, 17, 18, 19 and a planetary gear portion (afront sun gear 9, a ring sun gear 10, pinions 11, 12 and a ring gear 13), wherein hydraulic pressure generated by an oil pump 21 is used for operating the clutches 16 to 19. The oil pump 21 is directly driven by the vehicle engine, not shown, oil is supplied from an oil reservoir 22 (intaken) to a line pressure circuit 37. The hydraulic pressure of the circuit 37 is regulated by a pressure regulating valve 23, and is supplied to a manual valve 25. When this manual valve has its valve element or spool at a position N, the circuit 37 is connected to a circuit 38 which becomes the feed-back circuit of the pressure-regulating valve 23.

When the valve element of the manual valve 25 is at a position D, line pressure is supplied to a circuit 39, and is connected to a throttle valve 26, a governor valve 14, the forward clutch 16, 1-2 shift valve 27. The throttle valve opening of the engine is sensed as a plug displacement by the throttle valve 26. The displacement develops a hydraulic pressure, proportional to the opening in a circuit 40. This hydraulic pressure is the throttle pressure illustrated in the curve so labelled in FIG. 3.

Figure 4:
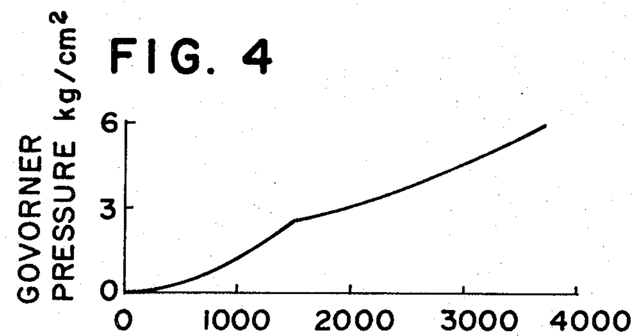

The line pressure applied to the governor valve 14 is supplied to a circuit 41 when the hydraulic pressure corresponding to the speed of the output shaft 15 (corresponding to the vehicle speed) is generated by the governor valve 14. This hydraulic pressure is termed governor pressure. The relationship between the output shaft speed and the governor pressure is shown in the graph in FIG. 4.

The forward clutch 16 is the clutch always engaged in forward gear ratios and the line pressure is supplied to the servo piston by the circuit 39.

Figure 3:
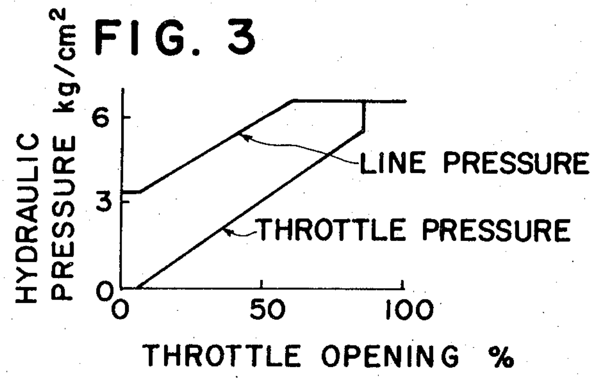

The throttle pressure is supplied by the circuit 40 to 1-2 shift valve 27, the pressure regulating valve 23 and a hydraulic switch valve 35, and the line pressure has the hydraulic characteristics as shown in FIG. 3 by the throttle pressure supplied to the pressure regulating valve 23. When the 1-2 shift valve 27 valve element is disposed toward the right side of the drawing, since the hydraulic pressure is not supplied to the clutch except the forward clutch 16, the planetary gear train is in the first speed gear ratio.

When the manual valve 25 is in its 2 and 1 position, the line pressure is connected to the circuit 42 and is supplied to 2-3 shift valve 29 and the hydraulic switch valve 35. The hydraulic switch valve 35 supplies the higher pressure of the circuits 42 and 40 to the circuit 43. When the manual valve is at 2 and 1 position, the line pressure is supplied to the circuit 43, and when the manual valve is at its D position, the throttle pressure is supplied. The circuit 43 supplies hydraulic pressure to 2-3 shaft valve 29, the engine brake valve 33 and the pressure-reducing valve 34.

When the manual valve 25 is at 1 position, the line pressure is also supplied to the circuit 44, and the line pressure is supplied to the range control valve 28.

Since the timing valve 31, variable orifice control valve 30, engine brake valve 33, compensator valve 32 and pressure-reducing valve 34 are particularly important in the present device, these valves will now be described in detail with reference to FIG. 5. The timing valve 31 is the valve for performing the first and second objects of the present invention, and has a casing 59 formed having a stepped cylindrical bore 58, a valve piston 60 therein, a sleeve 61 and a valve spring 62. The casing 59 has a plurality of inlets 63, 64, 65, 66, 67, 68, 69 and 70, all of which are opened to the bore 58. The piston 60 has axially spaced lands 71, 72, 73 and 74, and annular grooves 75, 76, and 77 between the lands. The inlet 63 is connected to the circuit 51. Inlet 64 is connected through a throttle 78 to the circuit 50. Inlet 65 is connected to the circuit 53. The inlet 66 is connected to the circuit 55 and inlet 67 is connected to the circuit 52 whereas inlets 68, 70 are connected to the circuit 54. The final inlet 69 is connected through the throttle 79 to the circuit 55.

The variable orifice control valve 30 is the valve for performing the first object of the present invention, and has a casing 81 formed having a stepped cylindrical bore 80, valve piston 82 therein and a valve spring 83. The casing 81 has a plurality of inlets 84, 85, 86, 87, 88 and 89, all of which are communicated with the bore 80. The piston 82 has axially spaced lands 90, 91 and 92, and annular grooves 93 and 94 between the lands. The inlets 85 and 89 are exhaust ports to the oil reservoir 22; the inlet 86 is connected to the circuit 51; the inlet 87 is connected to the circuit 55; and the circuits 51 and 55 are connected through a throttle 95. The inlet 88 is connected to the circuit 41.

The engine brake valve 33 is the valve for performing the first object of the present invention, and has a casing 97 formed having a cylindrical bore 96, a valve piston 98 and a valve spring 99. The casing 97 is formed having a plurality of inlets 100, 101, 102 and 103, and these inlets all communicate with the bore 96. The piston 98 has axially spaced lands 104 and 105, and annular groove 106 between the lands. The inlet 100 is connected to the circuit 43; the inlet 101 is connected to circuit 57; the inlet 102 is connected to the circuit 54; and the inlet 103 is an outlet to the oil reservoir 22. The circuits 54 and 57 are connected through a throttle 107.

The compensator valve 32 is the valve for performing the second object of the present invention, and has a casing 109 formed having a cylindrical hole 108, valve piston 109' and valve spring 110. The casing 109 has inlets 210, 111, 112, 113 and 114, all of which are opened to the hole 108. The piston 109' has lands 115 and 116, and annular groove 117 between the lands. The inlets 210 is connected to the circuit 53 through a throttle 118 and a check valve 119, the inlet 111 is connected to the circuit 55, inlet 112 is connected through the throttle 120 to the circuit 52, inlets 113 and 114 are outlets to the oil reservoir 22.

The pressure-reducing valve 34 has a casing 122 having stepped cylindrical hole 121, a valve piston 123 and valve spring 124. The casing 122 has inlets 125, 126, 127, 128 and 129, all of which are opened to the hole 121. The piston 123 has lands 130 and 131, and annular groove 132 between the lands. The inlet 125 is connected to the circuit 43, the inlet 126 is an outlet to the oil reservoir 22 through a throttle 133, the inlet 127 is connected to the circuit 134, the inlet 128 is connected to the circuit 53, and inlet 129 is an outlet to the oil reservoir 22.

The operation of the respective clutches in the power transmission of the device of this invention is as follows:

| | Clutch 16 | Clutch 17 | Clutch 18 | Clutch 19 | One-way Clutch 8 |
|---|---|---|---|---|---|
| 1st speed | O | | | | O |
| 2nd speed | O | | O | | |
| 3rd speed | O | O | | | |
| Reverse | | O | | O | |

Figure 6A:
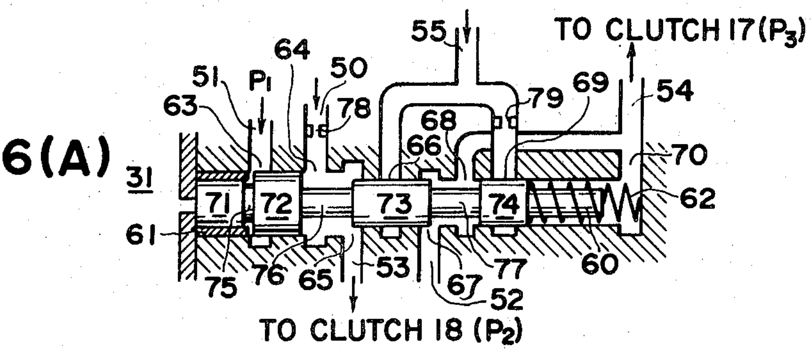

Operation of thus constructed hydraulic control device of this invention in speed shifting and functions of the valves will now be described. FIG. 1 is a hydraulic control circuit diagram at D position in second speed, and when the manual valve 25 is placed to D position, the line pressure is supplied to the circuit 39 from the circuit 37. Therefore, the hydraulic pressure is supplied to the clutch 16, simultaneously it is also supplied to 1-2 shift valve 27. In first speed, the line pressure is not supplied to the circuit 55, but when the governor pressure in the circuit 41 becomes high, 1-2 shift valve 27 becomes the second speed position shown in FIG. 1, so that the line pressure from the circuit 39 is supplied to the circuit 55. Therefore, the line pressure is also supplied through the circuit 50 to the circuit 51 and 2-3 shift valve 29. In first speed, the hydraulic pressure is not supplied to the timing valve 31 at all, and accordingly the piston 60 is in the state shown in FIG. 6(A) by the spring 62. In second speed, the hydraulic pressure from the circuit 51 is supplied to the inlet 63 so that the force of the product of the difference between the area of the lands 72 and 71 and the hydraulic pressure acts in the opposite direction to the tension of the spring with the result that the timing valve 31 gets into the state shown in FIG. 6(D). The line pressure is supplied from the circuit 55 to the curcuits 53 and 54, but the hydraulic pressure supplied to the clutch 17 through the throttle 79 is delayed in increasing due to the interferance of the clutch piston (now shown), while the supply of the hydraulic pressure to the clutch 18 is conducted early since the resistance such as throttle is not existent. Therefore, when the engagement of the clutch 18 is started so that the force of the hydraulic pressure imparted to the difference between the area of the lands 72 and 73 becomes large, the piston 60 moves again to the state as shown in FIGS. 6(A). At this time, since the piston 109' of the compensator valve 32 is supplied with the hydraulic pressure of the circuit 53 through the check valve 119 from the inlet 210, it moves rightward against the spring 110. Therefore, since the inlet 112 is connected to the inlet 113, the hydraulic pressure of the clutch 17 is exhausted through the circuits 57, 54 and 52.

Figure 7E:
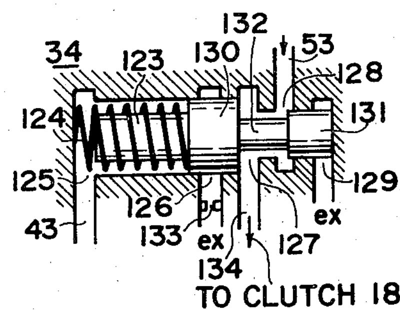
Figure 7F:
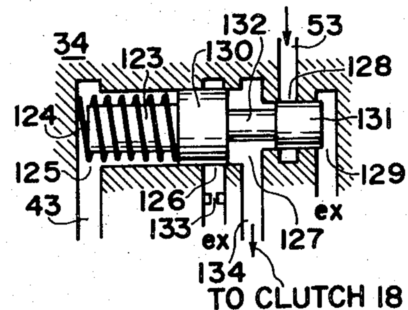

The hydraulic pressure to the clutch 18, even though the timing valve 31 gets into the state as shown in FIG. 6(A) the inlet 64 is connuminated with the inlet 65 so that it is supplied through the circuits 55, 51, and 50, throttle 78, circuits 53 and 134. Whereupon, if the piston 123 of the pressure-reducing valve 34 is in the state as shown in FIG. 7(E), the hydraulic pressure supplied to the clutch 18 becomes the line pressure, but if it is in the state as shown in FIG. 7(F), it becomes the hydraulic pressure reduced than the line pressure. The area of the land 130 is represented by A4, the area of the land 131 by A5, the force of the spring 124 in the state shown in FIG. 7(F) by *f*2, and the hydraulic pressure of the inlet 127, i.e., the clutch 18 by P2'. Since the throttle pressure Pth is supplied through the circuit 40, transfer valve 35 and circuit 43 to the inlet 125, the formula (1) becomes consistent in the state as shown in FIG. 7(F).

$$Pth \cdot A4 + f2 = P2' (A4 - A5) \quad (1)$$

The formula (2) becomes consistent in the state as shown in FIG. 7(E).

$$Pth \cdot A4 + f2 > P2' (A4 - A5) \quad (2)$$

In consideration with that P2' may not rise higher than the line pressure P*l*, it is understood that the hydraulic pressure imparted to second speed clutch 18 becomes the one lower than the line pressure only when the throttle opening is small as shown in FIG. 8.

The above description relates to the hydraulic pressure of second speed clutch 18 at D position, but generally in the state of second speed at D position, and within the range where the throttle opening is small, where exists only small range from about 500 rpm to about 1,000 rpm by the output shaft speed, with the result that the torque of the second speed clutch 18 is very small so that the hydraulic pressure may be small.

At 2 position of the transmission, the transmission operates to automatically shift between first and second speeds only, but does not shift to third speed, and even it is at third speed at D position, the transmission is shifted always down to second speed at 2 position.

Since the hydraulic pressure supplied to the inlet 125 becomes the line pressure through the circuit 42, switch valve 35 and circuit 43 at 2 position, the pressure-reducing valve 34 gets into the state of E, the line pressure is imparted to the clutch 18 for all throttle opening. The hydraulic pressure change of the clutch 18 when the transmission is shifted up from first to second speed at D position becomes as shown in FIG. 9.

The hydraulic pressure of the respective portion when shifted up from second to third speed will now be described in detail.

If the vehicle speed is increased while travelling at second speed, the hydraulic pressure of the governor circuit 41 is increased so that 2-3 shift valve 29 moves leftward with the result that the circuit 50 is introduced to exhaust port. Whereupon, the hydraulic pressure of the inlet 65 is lowered so that the leftward force acting onto the difference between the area of the lands 72 and 73 is decreased, and accordingly the piston 60 of the timing valve 31 moves to the position in the state of FIG. 6(C). Since the line pressure is supplied from the circuit 55 to the inlet 66 in such state, the hydraulic pressure P2 of the inlet 65 becomes the one with which the force of the piston 60 is balanced. The hydraulic pressure is supplied from the circuit 55 through the throttle 79 to the inlet 69, and the hydraulic pressure is supplied from the inlet 68 through the circuit 54 to third speed slutch 17 in the state of FIG. 6(C). The hydraulic pressure of the clutch 17 is supplied to the inlet 70 to give the leftward force onto the area of the land 74.

Figure 6B:
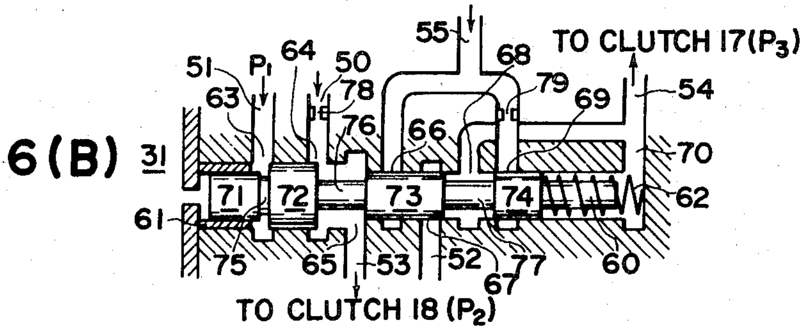
Figure 6C:
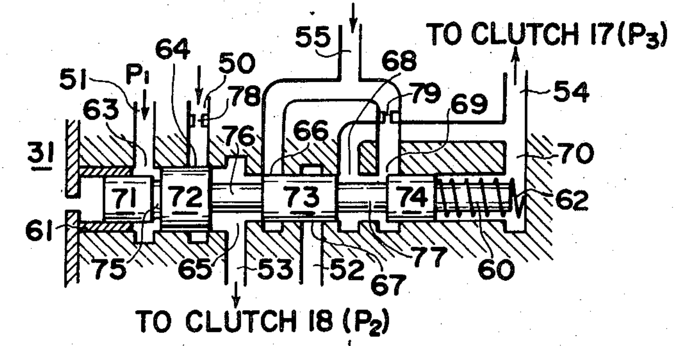
Figure 6D:
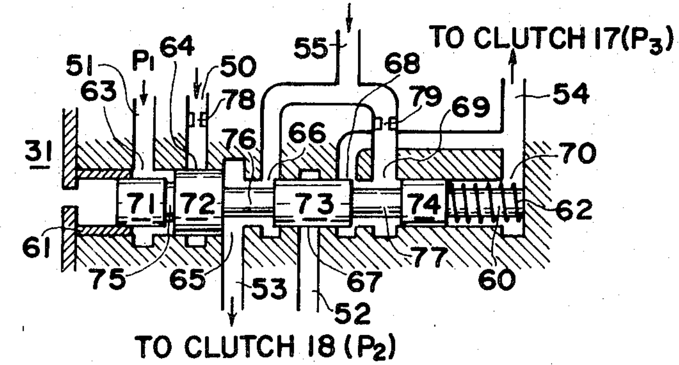

The area of the land 71 is represented by A1, the area of the land 72 by A2, the area of the lands 73 and 74 by A3, the force of the spring 62 by *f*1, the hydraulic pressure of the inlet 63 by P1, the hydraulic pressure of the inlet 65 by P2, the hydraulic pressure of the inlet 70 by P3, and in the respective states in FIGS. 6(B) and 6(C), the axial force acting onto the piston 60 is balanced, so accordingly the following formula (3) is consistent.

$$P1(A2 - A1) = P2(A2 - A3) + P3 \cdot A3 + f1 \quad (3)$$

Since the value of P1 is held always at the line pressure when the transmission is shifted up from second to third speed, it is understood from the formula (3) that as the hydraulic pressure P3 of the third speed clutch 17 is increased the supply pressure P2 of the second speed clutch 18 is lowered. The change of the hydraulic pressure of both clutches in this case is shown in FIG. 10. Both the hydraulic pressure has proper overlapping, but the line pressure is varied with the output torque of the engine, and yet as is clear from the formula (3), the overlapping is varied with the line pressure, and accordingly when the output torque of the engine is large, the overlapping is large, and when the output torque is small, the overlapping is small. If the hydraulic pressure of third speed clutch 17 is increased at this time, P3 becomes large, and accordingly it moves from the state of FIG. 6(C) to the state of FIG. 6(B). In such state of FIG. 6(B), the hydraulic pressure of second speed clutch 18 is exhausted through the throttle 78 and the throttle 135 of 2-3 shift valve, but if the hydraulic pressure of the inlet 210 of the compensator valve 32 is decreased, the piston 109' moves leftward.

Since due to the check valve 119 the oil from the inlet 210 passes through the throttle 118 to be exhausted, the piston 109' requires some time (0.5–0.8 sec.) to return leftward fully. Meanwhile, the engagement of third speed clutch 17 is started and the timing valve 31 gets into the state of FIG. 6(B) with the result that the inlet 67 is connected through the circuit 52, throttle 120 and inlets 112 and 113 of the compensator valve 32 to the outlet, and accordingly the hydraulic pressure supplied to the clutch 17 is lower than the line pressure to be held to the strength determined by the valve of P2. Before the piston 109' returns fully leftward, the engagement of the third speed clutch 17 is completed, and since the inlet 111 is connected to the inlet 112 when the piston 109' returns fully leftward, the line pressure is supplied from the circuit 55 to the inlet 67. Therefore, the hydraulic pressure of the inlet 68 becomes line pressure and P3 becomes the line pressure with the result that the timing valve 31 gets into the state of FIG. 6(A). The above description relates to the case that the piston 98 of the engine brake valve 33 is disposed at the position shown in FIG. 5 so that the inlets 101 and 102 are connected with the result that the hydraulic pressure of the clutch 17 is equal to that of the circuits 57 and 54. Since the hydraulic pressure supplied to the inlet 100 is equal to that supplied to the inlet 125 of the pressure-reducing valve 34, and the hydraulic pressure from the circuit 43, it is the throttle pressure or line pressure at 2 of 1 position. Therefore, when the throttle opening is over 14 percent at D position, the piston 98 of the engine brake valve 33 is disposed rightward and when it is less than 14 percent, it is disposed leftward.

When the throttle opening is below 14 percent, the transmission is shifted up from two to three speeds in the state of engine brake, for example, the piston 98 of the engine brake valve 33 is urged leftward by the spring 99. Since the hydraulic pressure of the clutch 17 is held small while the clutch piston moves during the interferance, the circuit 57 becomes small hydraulic pressure of more or less 0.5Kg/cm². However, since the oil of the circuit 54 passes through the throttle 107 to be supplied to the circuit 57, the hydraulic pressure of the circuit 54 becomes somewhat high. Therefore, since P3 in the formula (3) becomes high, P2 becomes low and the hydraulic pressure of the second speed clutch 18 becomes sufficiently low so that the interval is provided between both clutches. The change of the hydraulic pressure in this case is shown in FIG. 11.

When the throttle opening is large as above, that is, when the engine is in driving state, the overlapping corresponding to the output torque of the engine is provided for the engagement between two and three speed cluches, while when the throttle opening is small, that is when the engine is in driven state, and second speed clutch is disengaged, and after waiting until the engine speed is sufficiently lowered, third speed clutch is engaged, and accordingly the defects of the clutch and uncomfortable torque change is avoided in the output shaft of the transmission. Then, the hydraulic pressure of the respective clutches when the transmission is shifted down from third to second speed will now be described.

The down shift from third to second speed is conducted when 2–3 shift valve 29 gets into the state of FIG. 1 so that the circuits 51 and 50 are connected.

When the hydraulic pressure is supplied to the circuit 50, since the timing valve 31 is in the state of (A), the hydraulic pressure is supplied through throttle 78, inlets 64 and 65, circuit 53 from check valve 119 to the inlet 210 of the compensator valve 32. Since the spring 110 is very weak, the piston 109' immediately starts to move rightward so that the inlets 112 and 113 are connected with the result that the circuit 52 is connected through the throttle 120 to the outlet, accordingly the hydraulic pressure of the inlet 67 of the timing valve 31 and the hydraulic pressure P3 of the inlets 68 and 70 are lowered so that the timing valve 31 gets into the state of FIG. 6(B). In the state of (B), since the line pressure is supplied from the inlet 69, the hydraulic pressure P3 of the circuit 54 (equal to the hydraulic pressure of the clutch 17) is not lowered any more.

Since the relationship between the hydraulic pressure $Pl$ of the circuit 55, hydraulic pressure P1 of the circuit 51 and the hydraulic pressure P2 of the circuit 53 becomes different according as the variable orifice control valve 30 is any of the state of FIG. 12(B), (H), (I), the relationship between P2 and P3 becomes also different by the formula (3).

The area of the land 90 of the piston 82 of the orifice control valve 30 is represented by A6, the area of the land 91 is by A7, the area of the land 92 by A8, the force of the spring 83 by $f3$, and the governor pressure of the circuit 41 by Pg, and the respective state (G), (H), (I) are represented by the formulae (4), (5) and (6). In the state (G), $$P1 = Pl,\ Pg(A7 - A8) + P1(A6 - A7) < f3 \quad (4)$$

In the state (H), $$Pl > P1,\ Pg(A7 - A8) + P1(A6 - A7) = f3 \quad (5)$$

In the state (I), $$Pl > P1, Pg(A7 - A8) + P1(A6 - A7) > f3 \quad (6)$$

The governor pressure Pg is the hydraulic pressure generated by the governor 14 with the line pressure $Pl$ as the supply pressure, and accordingly it may not rise higher than the line pressure. Considering this, and taking the speed of the output shaft 15 at abscissa, and throttle opening at ordinate to draw the limit drawing of the respective state, FIG. 13 provides the drawing. Here, the boundary of the states (H) and (I) is obtained by substituting $P2 = P3 = 0.5Kg/cm^2$ in the formula (3) into the P1 of the formula (6) and then by substituting the value obtained previously thereto.

In the state of FIG. (G), the hydraulic pressure P1 of the inlet 63 of the timing valve 31 is equal to the line pressure, and accordingly while the servo piston of the second speed clutch 18 fills the interferance, P2 is held in constant low hydraulic pressure (such as, for ecample, $P2 = 0.5Kg/cm^2$), and accordingly the hydraulic pressure P3 of three speed clutch 17 becomes the hydraulic pressure expressed by the formula (3), so that the third speed clutch 17 does not slip by this hydraulic pressure.

When the second speed clutch 18 starts to engage, with the timing valve 31 in the state of FIG. 6(B) P2 is increased, but as is clear in the formula (3), the hydraulic pressure P3 of the third speed clutch 17 is decreased, so that if the hydraulic pressure becomes $0.5Kg/cm^2$, the balance of the state (B) is broken so that P2 is further increased to get into the state of FIG. 6(A). In FIG. 14, the change of the hydraulic pressure of second and third speed clutches 18 and 17 is shown when the orifice control valve 30 is in the state of FIG. 12(G), but the hydraulic pressure of the third speed clutch 17 is controlled by the hydraulic pressure of the second speed clutch 18 and moreover in the formula (3) $P1 = Pl$ is varied with the throttle opening, so accordingly the overlapping of the hydraulic pressure between both clutches is varied by the output torque of the engine.

In the state of FIG. 12(H), P1 given by the formula (5) is supplied to the inlet 63 of the timing valve 31, but if the vehicle speed is varied so that the governor pressure $Pg$ is varied, P1 is varied accordingly.

Therefore, in the state of FIG. 6(B), the timing valve 31 is held by $P2 = 0.5Kg/cm^2$ while the servo piston of the second speed clutch 18 is filled in the interference, and accordingly P3 is imparted by the formula (3), but if P1 is large as to this valve, P3 is also large, while if P1 is small, P3 is also small. When the orifice control valve 30 is in the state of (H), the vehicle speed is increased so that if $Pg$ is increased, P1 is decreased from the formula (5). Therefore, the hydraulic pressure of the three speed clutch 17 is decreased with the increase of the vehicle speed. When the second speed clutch 18 starts to engage, P2 is increased so that P3 is decreased in the corresponding amount. When P3 becomes $0.5Kg/cm^2$, the servo piston of third speed clutch 17 starts to return from the engaging state, and accordingly P3 holds generally constant pressure, but P2 is further increased so that the balanced state of the state (B) is broken with the result that the timing valve 31 gets into the state (A). FIG. 15 shows the timing change of both the clutches hydraulic pressure, and as the vehicle speed is increased, the valve of P3 of P2 — $0.5Kg/cm^2$ is lowered so that before the second speed clutch 18 does not start to engage, third speed clutch 17 slips so that the engine speed is increased to the speed corresponding to second speed, and then second speed clutch 18 is engaged. As the vehicle speed is increased, the flow rate from the inlet 87 to the inlet 86 of the orifice control valve 30 is reduced with the result that the time T in FIG. 15 becomes large.

In the state of (I), the oil imparted from the circuit 55 to the circuit 51 passes through the throttle 95 only so that P1 is lowered, and accordingly even if the downshift from third to second takes place, the timing valve 31 is held in the state of (A), and the hydraulic pressure of the third speed clutch 17 is exhausted from the outlet 113 of the compensator valve 32, so that while the servo piston of second speed clutch 18 fills the interferance, both the clutches are not engaged at all. During the interval, the engine speed is only increased, so that after it increases to the speed corresponding to second speed, the second speed clutch 18 is engaged (See FIG. 16).

When the transmission is selected from D position to 2 position at high speed (such as, for example, output shaft speed 3,000 rpm) in the engine brake state, 2-3 shift valve 29 is fixed always to second speed position, but at that time as is clear from FIG. 13, it is in the state of (G) of the orifice control valve 30, as shown in FIG. 14, the overlapping exists between P3 and P2, and yet the pressure-reducing valve is supplied with the line pressure to the inlet 125 to become the state of (E), and accordingly strong engine brake is obtained at the same time uncomfortable bland state upon speed change is eliminated.

The automatic transmission including plural clutches is described in the above embodiment, but even if these clutch is converted by the brake, similar operation and effect may be obtained without departing this invention.

As the foregoing description, according to the hydraulic control device for automatic transmission of the present invention, the operation of the respective clutches (or brakes) are properly conducted in response to the respective state of up-shift or down-shift, the occurrence of overload is prevented so that extremely smooth shifting is conducted, and when this is used in automobile, uncomfortable shock upon shifting is removed so as to improve the riding feeling.

What I claim and desire to secure by Letters Patent is:

1. A hydraulic control system for an automatic transmission having a plurality of drive ratios, comprising:

a. oil pump means (21) driven by a vehicle engine for providing hydraulic fluid under pressure;

b. a hydraulic fluid pressure regulating valve (23) receptive of said hydraulic fluid under pressure for providing hydraulic fluid at a regulated line pressure;

c. first means defining a hydraulic fluid flow path between said hydraulic fluid pump means (21) and said hydraulic fluid pressure regulating valve (23) for delivering said hydraulic fluid under pressure thereto;

d. first hydraulically actuated clutch means (18) for engaging and disengaging a transmission into a low-speed drive ratio state in response to hydraulic fluid pressure variations in hydraulic fluid applied thereto;

e. second hydraulically actuated clutch means (17) for engaging and disengaging a transmission into a high speed drive ratio state in response to hydraulic fluid pressure variations in hydraulic fluid applied thereto;

f. a shift valve (29) receptive of hydraulic fluid at said regulated line pressure for selectively providing said hydraulic fluid to said first clutch means (18) and said second clutch means (17).

g. second means defining a hydraulic fluid flow path between said hydraulic fluid pressure regulating valve (23) and said shift valve (29) for delivering said hydraulic fluid at said regulated line pressure thereto;

h. third means defining hydraulic fluid flow path between said shift valve (29) and said first clutch means (18) and said second clutch means (17) for delivering hydraulic fluid thereto; and i. said third passage means including a timing valve (31), said shift valve (29) and said timing valve (31) comprise means for increasing a pressure of said hydraulic fluid delivered to said second clutch means (17) and for decreasing a pressure of said hydraulic fluid delivered to said first clutch means (18) when a speed at which said transmission is being driven is accelerating, and for decreasing a pressure of said hydraulic fluid delivered to said second clutch means (17) and for increasing pressure of said hydraulic fluid delivered to said first clutch means 18 when a speed at which said transmission is being driven is decelerating to simultaneously engage said first clutch means (18) and said second clutch means (17) for a period of time during changes of said drive ratio state of said transmission.

2. A hydraulic control system for an automatic transmission having a plurality of drive ratios according to claim 1, further comprising:

a. a throttle valve (26) receptive of said hydraulic fluid under pressure for providing hydraulic fluid having pressure variations representative of an output torque of said engine;

b. fourth means defining a hydraulic fluid flow path between said hydraulic fluid pump means (21) and said throttle valve (26) for delivering said hydraulic fluid under pressure thereto;

c. fifth means defining hydraulic fluid flow path for delivering path hydraulic fluid having pressure variations representative of said engine output torque to said hydraulic fluid pressure regulating valve (23);

d. said hydraulic fluid pressure regulating valve (23) having means responsive to said pressure variations representative of said engine output torque for varying the pressure of said regulated line pressure in response thereto; and e. said third passage means including said timing valve (31) comprising means responsive to said variations of said regulated line pressure representative of said engine output torque for increasing a period of overlap when said first clutch means (18) and said second clutch means (17) are simultaneously engaged with increasing output torque.

3. A hydraulic control system for an automatic transmission having a plurality of drive ratios according to claim 2, further comprising, shift control means for changing said drive ratio from low speed to high speed by disengaging said first clutch means (18) and for delaying engagement of second clutch means (17) until a speed of said engine matches a drive speed of said transmission and by disengaging said first clutch means (18) after said second clutch means (17) is engaged when said engine speed matches a drive speed of said transmission, said shift control means comprising:

a. an engine brake valve (33) connected in cascade between said timing valve (31) and said second clutch means (17), said engine brake valve (33) comprising means responsive to said pressure variations representative of said engine output torque for varying a flow of hydraulic fluid from said timing valve (31) to said second clutch means (17) in response to said engine output torque;

b. an orifice (79); and c. sixth means defining a hydraulic fluid flow path connecting said orifice (79) in series between said hydraulic fluid pump means (21) and said timing valve (31).

4. A hydraulic control system for an automatic transmission having a plurality of drive ratios according to claim 1, wherein said shift valve (29) and said timing valve (31) comprise means for varying pressure of said hydraulic fluid delivered to said first clutch means (18) and said second clutch means (17) as shown in FIG. 10.

* * * * *